Nov. 3, 1936. A. V. SANTARSIERO 2,059,610
AIRCRAFT
Original Filed Dec. 28, 1934
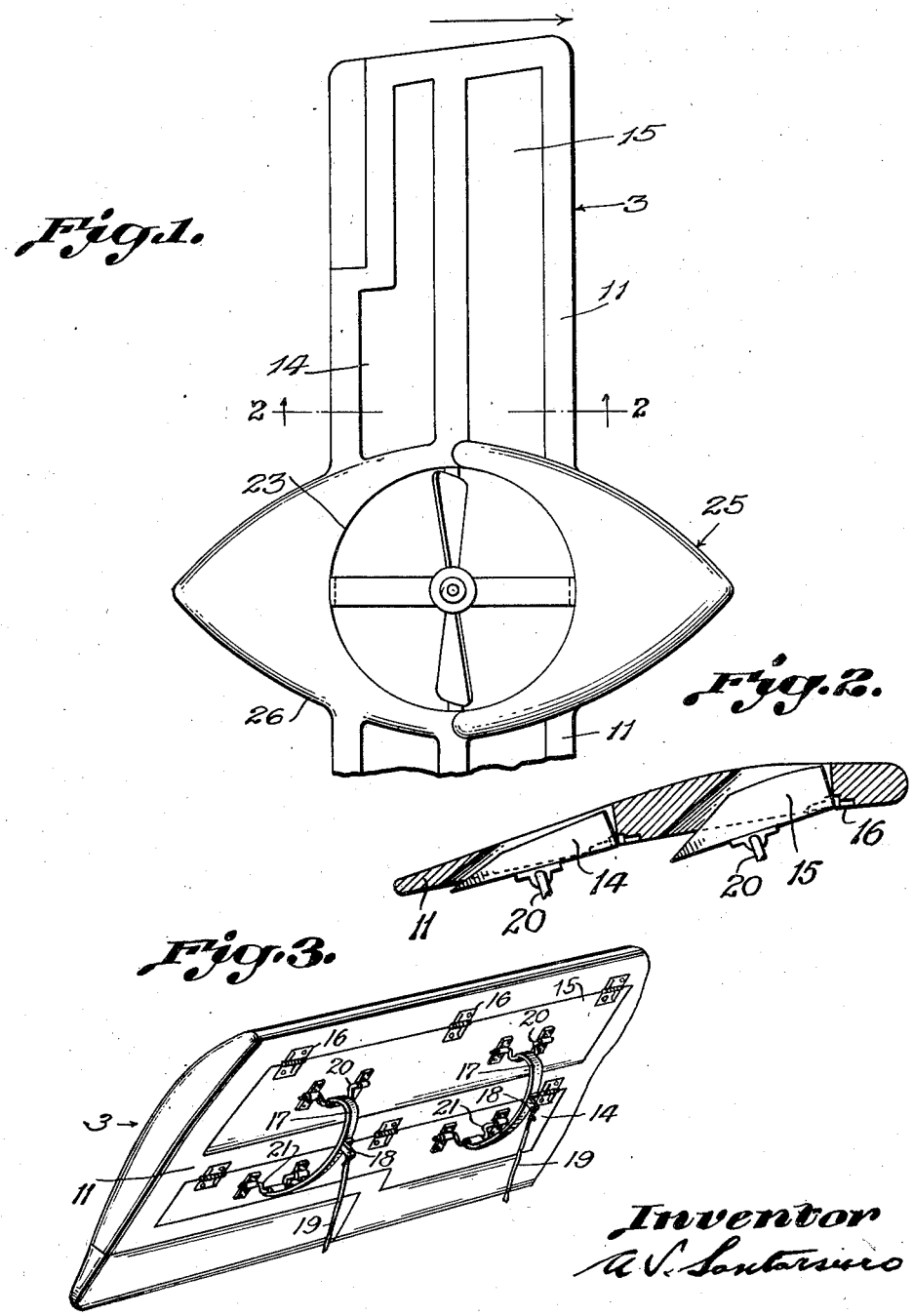
Inventor
A. V. Santarsiero Patented Nov. 3, 1936

2,059,610

UNITED STATES PATENT OFFICE 2,059,610

AIRCRAFT

Antonio V. Santarsiero, New York, N. Y.

Application December 28, 1934, Serial No. 249
Renewed September 19, 1936

2 Claims. (Cl. 244—12)

This invention relates to aircraft and has for its object the provision of means for enabling the craft to rise and descend vertically, and for improving the efficiency and enhancing the safety of flight.

This specification contains subject matter common to my patent Serial #1,988,919.

Another object of the invention is the provision of louvres in the wing or air foil and hinged panels normally closing said louvres for horizontal flight, but being arranged to be positively opened, reducing the wing or air foil to a mere framework for minimizing the resistance to vertical flight.

A further object of the invention is a control system so arranged that the hinged panels have freedom of movement during normal flight whereby they may respond to differential pressures above and below the wing on either side thereof, yielding to superior pressures on either wing from above, and maintaining the lateral stability of the aircraft.

Other objects of the invention will appear as the following description of a preferred and practical embodiments thereof proceeds.

In the drawing which accompanies and forms a part of the following specification and throughout the several figures of which the same characters of reference have been designated to identify identical parts:

Figure 1 is a plan view of a portion of the wing;

Figure 2 is a cross section taken along the line 2—2 of Figure 1;

Figure 3 is a perspective view of the underside of a portion of the wing.

The wing is constituted by a framework 11 or its equivalent, provided with openings or louvres 12 and 13, preferably symmetrically disposed on opposite sides of the wing and normally closed by hinged panels 14 and 15. The panels are normally kept closed in any suitable manner as by the spring hinges 16. When the air craft is in horizontal flight, the air pressure on the undersides of the panels maintains them normally shut, while when the aircraft is rising vertically, the pilot minimizes the resistance of the wing by opening the panels in a positive manner, reducing the end portions of the wing structure to a mere framework, so that as the aircraft rises vertically through the instrumentality of the helicopter propeller the displaced air may freely pass through the opposite sides of the wing. The means for positively opening the panels 14 and 15 may be of any suitable construction.

A practical means has been illustrated more or less in detail in Figure 3, comprising levers 17 each including a curved arm pivotally connected to the under surfaces of the panels and a lug 18 to which an operating cable 19 may be attached and leading to an accessible point in the fuselage. The levers 17 are connected to the panels through the intermediary of links 20 and 21, providing lost motion so that in any operative position of the levers 17, compelled by the cables 19, the panels will be capable of opening independently of said operating means through a range limited by the throw of the links 20 and 21.

Independent opening movement of the panels affords an efficient system of stabilizing control for the aircraft when in flight, under conditions frequently met with particularly in stormy weather when powerful downwardly sweeping currents strike with unequal force on the opposite sides of the upper surface of the wing, the craft will be dangerously tipped laterally from its level position. Under the conditions of the present invention, when the aircraft is in horizontal flight, and by that is meant flight in any direction except with the helicopter propellers, the forward motion of the craft creates a pressure on the lower sides of the panels which holds them shut. When however a downwardly directed current of air in excess of the head resistance impinges upon the upper sides of the panels, unequally on the sides of the wing, the predominant pressure will cause the panels on one or the other side to open to a greater or less extent according to the relative value of the downward pressure.

This affords a relief for the side of the wing which is overburdened, permitting the aircraft to maintain its lateral equilibrium.

The wing is especially modified for the passage of the slip stream generated by the helicopter propeller. With this end in view, the wing is provided with a circular opening 23, and with suitable struts intersecting said opening and affording support for the shaft of the helicopter propeller.

While I have in the above disclosure described what I believe to be practical features of the invention, it is obvious that the specific details of the structure in which these features are embodied be merely by way of example and not to be construed as limiting the scope of the invention as claimed.

I claim:

1. In an aeroplane provided with a helicopter propeller, a wing having front and rear elongated openings therethrough from top to bottom and extending from near the center line on each side to points adjacent the tips, panels pivotally mounted at their leading edges in each of said openings and adapted to swing downwardly to permit air to pass through the openings, resilient means to urge the panels to closed position, links mounted beneath each wing and connecting the front and rear panel on each side, manual control means to open said panels against the force of said resilient means, and lost motion connections between the manual control means and said panels on each side whereby the panels may be forced downwardly by a predominance of air pressure on the upper side independently of said manual control means.

2. A wing as set forth in claim 1 in which there is a lost motion connection between the link and each of said panels.

A. V. SANTARSIERO.